United States Patent
Yanniello

(10) Patent No.: US 8,228,652 B2
(45) Date of Patent: Jul. 24, 2012

(54) ARC FLASH DETECTION APPARATUS AND ELECTRICAL SYSTEM INCLUDING THE SAME

(75) Inventor: Robert Yanniello, Asheville, NC (US)

(73) Assignee: Eaton Corporation, Cleveland, OH (US)

( * ) Notice: Subject to any disclaimer, the term of this patent is extended or adjusted under 35 U.S.C. 154(b) by 317 days.

(21) Appl. No.: 12/792,011

(22) Filed: Jun. 2, 2010

(65) Prior Publication Data

US 2011/0299200 A1 Dec. 8, 2011

(51) Int. Cl.
*H02H 3/00* (2006.01)
(52) U.S. Cl. .......................................... 361/62
(58) Field of Classification Search .............. 361/42, 361/62
See application file for complete search history.

(56) References Cited

U.S. PATENT DOCUMENTS

| | | | |
|---|---|---|---|
| 4,835,648 A * | 5/1989 | Yamauchi | 361/14 |
| 5,473,494 A * | 12/1995 | Kurosawa et al. | 361/3 |
| 5,933,308 A | 8/1999 | Garzon | |
| 6,141,192 A * | 10/2000 | Garzon | 361/5 |
| 6,229,680 B1 | 5/2001 | Shea | |
| 6,633,009 B1 | 10/2003 | Shea | |
| 6,657,150 B1 | 12/2003 | Shea et al. | |
| 6,693,438 B2 | 2/2004 | Shea | |
| 6,724,604 B2 | 4/2004 | Shea | |
| 6,839,209 B2 | 1/2005 | Shea et al. | |
| 7,035,068 B2 | 4/2006 | Shea | |
| 7,145,757 B2 | 12/2006 | Shea et al. | |
| 7,499,251 B2 * | 3/2009 | Byron | 361/42 |
| 7,536,914 B2 * | 5/2009 | Land et al. | 73/705 |
| 7,580,232 B2 * | 8/2009 | Caggiano et al. | 361/5 |
| 7,821,749 B2 * | 10/2010 | Asokan et al. | 361/1 |
| 7,929,260 B2 * | 4/2011 | Roscoe et al. | 361/2 |
| 2008/0170344 A1 | 7/2008 | Byron | |
| 2011/0299200 A1 * | 12/2011 | Yanniello | 361/42 |

FOREIGN PATENT DOCUMENTS

EP 2 031 727 A2 3/2009

OTHER PUBLICATIONS

European Patent Office, "International search report and Written Opinion", Dec. 9, 2011, 13 pp.

* cited by examiner

*Primary Examiner* — Ronald W Leja
(74) *Attorney, Agent, or Firm* — Eckert Seamans Cherin & Mellot, LLC; Kirk D. Houser

(57) ABSTRACT

An electrical system includes first, second and third power busses; a first interrupter electrically connected between the first and second power busses; a second interrupter electrically connected between the second and third power busses; at least one of a shorting apparatus operatively associated with the second power bus, and the first interrupter comprising a trip coil; a current sensor to sense a fault current of at least a predetermined magnitude flowing in the second power bus and responsively output a first signal; a number of light sensors to sense an arc flash operatively associated with a number of the second and third power busses and responsively output a second signal; and a circuit to delay and invert the first signal to provide a third signal, and to operate the at least one of the shorting apparatus and trip coil responsive to an AND of the first, second and third signals.

20 Claims, 4 Drawing Sheets

000# ARC FLASH DETECTION APPARATUS AND ELECTRICAL SYSTEM INCLUDING THE SAME

BACKGROUND

1. Field

The disclosed concept pertains generally to electrical systems and, more particularly, to electrical power systems that are subject to arc flashes. The disclosed concept also pertains to arc flash detection apparatus.

2. Background Information

Electric power systems incorporate switches for control and protection purposes. Distribution systems, which form part of the overall electric power system, include main and feeder power buses and circuit breakers mounted in metal cabinets to form switchgear. Interruption of current flow in the buses of the distribution system by a circuit breaker creates an arc as the contacts of the circuit breaker open. These arcs caused by interruption are generally contained and extinguished in the normal course of operation of the circuit breaker.

At times, however, unintended arcing faults can occur within switchgear cabinets, such as between power buses, or between a power bus and a grounded metal component. Such arcing faults can produce high energy gases, which pose a threat to the structure and nearby personnel. This is especially true when maintenance is performed on or about live power circuits. For example, a worker might inadvertently short out the power bus, thereby creating an arcing fault inside the enclosure. The resulting arc blast creates an extreme hazard and could cause injury or even death. This problem is exacerbated by the fact that the enclosure doors are typically open for maintenance.

A common approach to protecting personnel from arcing faults in switchgear has been to design the metal enclosures to withstand the blast from the arcing fault. This has been done at great additional costs due to the heavy gauge metal used and numerous weld joints needed to prevent flying debris. Even with these precautions, the blast from an arcing fault inside the switchgear may not be contained.

Various known methods seek to minimize the severity of the blast from an internal arcing fault. These methods include pressure sensing and light detection, which sense the arcing fault within the switchgear and cause a circuit breaker to trip before significant damage can result. The pressure sensing method is limited by the insensitivity of the pressure sensors. By the time cabinet pressure has risen to detectable levels, the arcing fault has already caused significant damage.

In an electrical system, an internal arcing fault can occur somewhere inside of the switchgear enclosure, frequently, but certainly not limited to the point where the power cables servicing the load are connected.

In an electrical system, such as, for example, a motor control center, an internal arcing fault could occur within the load center panelboard when, for example, servicing line panelboards. A bare live copper bus could inadvertently be shorted. Another example for both low and medium voltage systems would be the shorting of power conductors by rodents, snakes, or other animals or objects.

In the low voltage system, the arcing fault could clear itself, by burning or ejecting the short, but it may take more than one-half cycle to do so, thereby causing significant damage and great risk of injury to workers even in one-half cycle of arcing.

A medium voltage system could behave similar to a low voltage system; however, the medium voltage system would be less likely to be self-extinguishing.

It is known to employ a high-speed shorting switch to eliminate an arcing fault. Known arc elimination devices and systems produce a bolted fault across the power bus (e.g., phase-to-phase, such as two switches for three phases; phase-to-ground, such as three switches for three phases), in order to eliminate the arcing fault and prevent equipment damage and personnel injury due to arc blasts. It is also known to employ various types of crowbar switches for this purpose. The resulting short on the power bus causes an upstream circuit breaker to clear the bolted fault by removing power. See, for example, U.S. Pat. Nos. 7,145,757; 7,035,068; 6,839,209; 6,724,604; 6,693,438; 6,657,150; and 6,633,009. As a result, system power is lost due to the tripping of the upstream circuit breaker. Once the arc is out, and if the short has been burned away or removed, then system power can be restored.

Arc flash light detection systems can employ only the light produced by arcing internal to electrical equipment (see, for example, U.S. Pat. No. 6,229,680), or can sense a combination of light and relatively high current. The addition of current sensing is intended to avoid nuisance operation for normal light sources (e.g., a camera flash; a flashlight). Protective devices, such as air circuit breakers (i.e., circuit breakers that interrupt current in air), produce arc bi-products during normal operation, such as, for example, copper vapor in the arc plasma exhausted from a circuit breaker's arc chute. Since such protective devices also operate during relatively high current conditions, the normal operation of these protective devices with an open arc chamber produces challenges when attempting to protect such devices against the condition of internal arcing, yet also make them immune to the normal arcing such devices produce during relatively high current protection conditions.

Hence, a problem is that known arc flash detection systems cannot differentiate between arcs due to an internal fault versus arcs emanating from an open circuit interrupter.

There is room for improvement in electrical systems.

There is also room for improvement in arc flash detection apparatus.

SUMMARY

These needs and others are met by embodiments of the disclosed concept, which detect an arc flash by sensing a fault current of at least a predetermined magnitude flowing in a power bus and responsively output a first logical signal, and sense an arc flash operatively associated with a power bus and responsively output a second logical signal. A circuit delays and inverts the first logical signal to provide a third logical signal, and operates one or both of a shorting apparatus and a trip coil responsive to a logical AND of the first logical signal, the second logical signal and the third logical signal.

Other embodiments of the disclosed concept detect an arc flash by sensing a fault current of at least a predetermined magnitude flowing in a power bus and responsively output a first logical signal, and sense an arc flash operatively associated with a power bus and responsively output a second logical signal. Another current sensor senses a fault current of at least a predetermined magnitude flowing in another power bus and responsively outputs a third logical signal. A circuit delays and inverts the third logical signal to provide a fourth logical signal, and operates one or both of a shorting apparatus and a trip coil responsive to a logical AND of the first logical signal, the second logical signal and the fourth logical signal.

In accordance with one aspect of the disclosed concept, an electrical system comprises: a first power bus; a second power bus; a third power bus; a first circuit interrupter electrically connected between the first power bus and the second power bus; a second circuit interrupter electrically connected between the second power bus and the third power bus; at least one of: (a) a shorting apparatus operatively associated with the second power bus, and (b) the first circuit interrupter comprising a trip coil; a current sensor structured to sense a fault current of at least a predetermined magnitude flowing in the second power bus and responsively output a first logical signal; a number of light sensors structured to sense an arc flash operatively associated with a number of the second power bus and the third power bus and responsively output a second logical signal; and a circuit structured to delay and invert the first logical signal to provide a third logical signal, and to operate the at least one of the shorting apparatus and the trip coil responsive to a logical AND of the first logical signal, the second logical signal and the third logical signal.

The shorting apparatus may have a first time to operate; the second circuit interrupter may have a second time to interrupt current; the delay circuit may provide a delay between the first logical signal being true and the third logical signal being true; and the delay may be greater than the first time and less than the second time.

The circuit may operate the shorting apparatus for a fault on the second power bus, but may not operate the shorting apparatus for a fault on the third power bus or for an arc generated by the second current interrupter when protecting against the fault on the third power bus.

As another aspect of the disclosed concept, an electrical system comprises: a first power bus; a second power bus; a third power bus; a first circuit interrupter electrically connected between the first power bus and the second power bus; a second circuit interrupter electrically connected between the second power bus and the third power bus; at least one of: (a) a shorting apparatus operatively associated with the second power bus, and (b) the first circuit interrupter comprising a trip coil; a first current sensor structured to sense a fault current of at least a predetermined magnitude flowing in the second power bus and responsively output a first logical signal; a number of light sensors structured to sense an arc flash operatively associated with a number of the second power bus and the third power bus and responsively output a second logical signal; a second current sensor structured to sense a fault current of at least a predetermined magnitude flowing in the third power bus and responsively output a third logical signal; and a circuit structured to delay and invert the third logical signal to provide a fourth logical signal, and to operate the at least one of the shorting apparatus and the trip coil responsive to a logical AND of the first logical signal, the second logical signal and the fourth logical signal.

As another aspect of the disclosed concept, an arc flash detection apparatus is for an electrical system comprising a first power bus, a second power bus, a third power bus, a first circuit interrupter electrically connected between the first power bus and the second power bus, a second circuit interrupter electrically connected between the second power bus and the third power bus, and at least one of: (a) a shorting apparatus operatively associated with the second power bus, and (b) the first circuit interrupter comprising a trip coil. The arc flash detection apparatus comprises: a current sensor structured to sense a fault current of at least a predetermined magnitude flowing in the second power bus and responsively output a first logical signal; a number of light sensors structured to sense an arc flash operatively associated with a number of the second power bus and the third power bus and responsively output a second logical signal; and a circuit structured to delay and invert the first logical signal to provide a third logical signal, and to operate the at least one of the shorting apparatus and the trip coil responsive to a logical AND of the first logical signal, the second logical signal and the third logical signal.

As another aspect of the disclosed concept, an arc flash detection apparatus is for an electrical system comprising a first power bus, a second power bus, a third power bus, a first circuit interrupter electrically connected between the first power bus and the second power bus, a second circuit interrupter electrically connected between the second power bus and the third power bus, and at least one of: (a) a shorting apparatus operatively associated with the second power bus, and (b) the first circuit interrupter comprising a trip coil. The arc flash detection apparatus comprises: a first current sensor structured to sense a fault current of at least a predetermined magnitude flowing in the second power bus and responsively output a first logical signal; a number of light sensors structured to sense an arc flash operatively associated with a number of the second power bus and the third power bus and responsively output a second logical signal; a second current sensor structured to sense a fault current of at least a predetermined magnitude flowing in the third power bus and responsively output a third logical signal; and a circuit structured to delay and invert the third logical signal to provide a fourth logical signal, and to operate the at least one of the shorting apparatus and the trip coil responsive to a logical AND of the first logical signal, the second logical signal and the fourth logical signal.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

Figure 1:
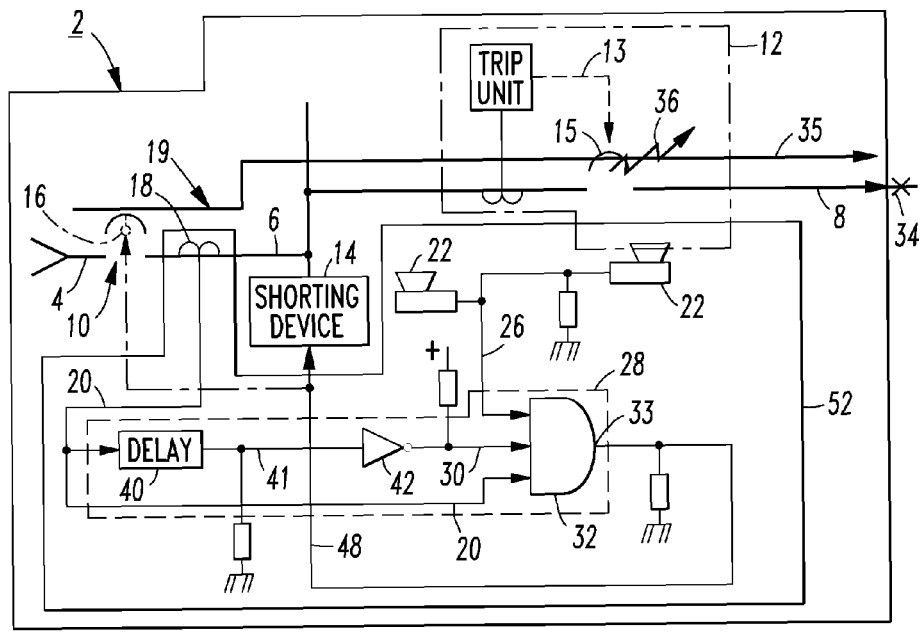
FIG. 1 is a block diagram in schematic form of an arc flash detection apparatus for use with switchgear comprising source service, main and feeder load side power buses, main and feeder circuit breakers, and a shorting device on the main power bus, with a fault on the feeder load side power bus in accordance with an embodiment of the disclosed concept.

Referring to FIG. 1, an electrical system 2 includes a first power bus 4 (e.g., without limitation, a source service power bus), a second power bus 6 (e.g., without limitation, a main power bus), a third power bus 8 (e.g., without limitation, a feeder load side power bus), a first circuit interrupter 10 (e.g., without limitation, main circuit breaker) electrically connected between the first and second power busses 4,6, and a second circuit interrupter 12 (e.g., without limitation, feeder circuit breaker) electrically connected between the second and third power busses 6,8. Although both are shown in the example of FIG. 1, the electrical system 2 can include one or both of a shorting apparatus, such as shorting device 14, operatively associated with the second power bus 6, and a trip coil, such as a shunt trip coil 16 of the first circuit interrupter 10. It will be appreciated that the first circuit interrupter 10 can be part of an electrical enclosure (not shown) for the second power bus 6 and the second circuit interrupter 12, or can be part of a separate assembly (not shown).

The example electrical system 2 further includes a current sensor 18 structured to sense a fault current 19 of at least a predetermined magnitude flowing in the second power bus 6 and responsively output a first logical signal 20. A number of light sensors 22 (two example light sensors 22 are shown, although any suitable number can be employed) are structured to sense an arc flash 24 (FIG. 3) or 36 (FIG. 1) operatively associated with a number of the second power bus 6 and the third power bus 8 and responsively output a second logical signal 26. A circuit 28 is structured to delay and invert the first logical signal 20 to provide a third logical signal 30, and to operate at least one of the shorting device 14 and the shunt trip coil 16 responsive to a logical AND, such as is provided by an example three-input AND gate 32, of the first logical signal 20, the second logical signal 26 and the third logical signal 30. The three-input AND gate 32 has an output 33 to operate at least one of the shorting device 14 and the shunt trip coil 16.

The example third power bus 8 can comprise any, some or all of a number of power busses (not shown), a number of power conductors (not shown), a number of power cables (not shown), and/or a number of loads (not shown), such as equipment (not shown) electrically connected external to an enclosure (not shown) housing the second circuit interrupter 12 on the "third power bus side" (e.g., to the right with respect to FIG. 1) of the second circuit interrupter 12.

The example current sensor 18 (e.g., without limitation, a current transformer (CT); a Rogowski coil; a Rogowski sensor) is structured to sense the fault current 19 and output the first logical signal 20 when the sensed fault current exceeds a predetermined magnitude. For example and without limitation, a current threshold of about two times the nominal CT rating can be employed. For example, this ensures that light sensing does not activate the shorting device 14 and/or the first circuit interrupter 10 due to normal or rated load current. Alternatively, any suitable current threshold can be employed.

Figure 2:
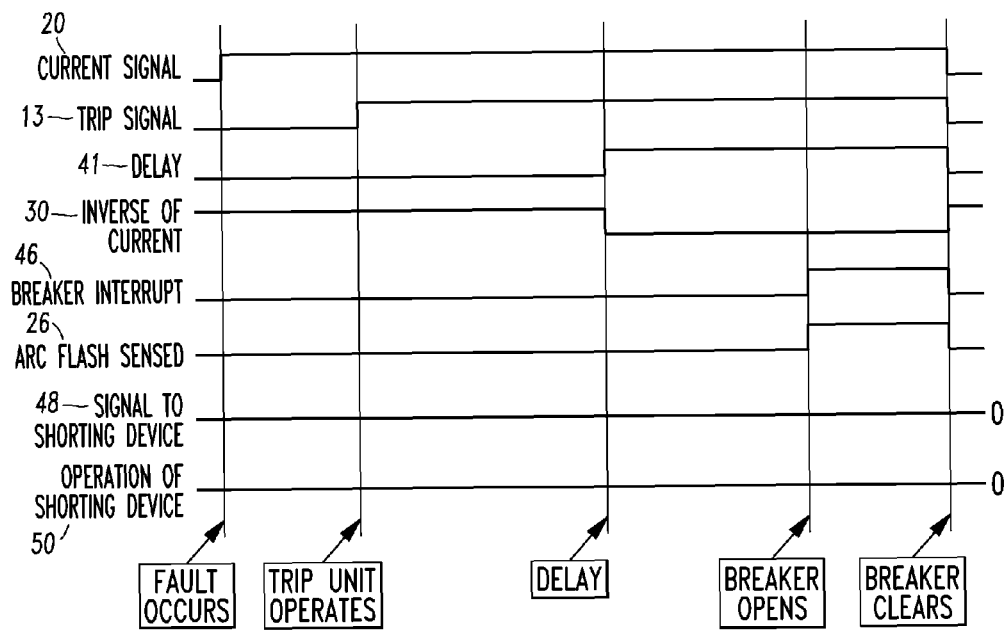
FIG. 2 includes plots of various signals versus time for the arc flash detection apparatus of FIG. 1.

In FIG. 2, the first logical (current) signal 20 is output by the current sensor 18, which senses primary current flow, such as the fault current 19 being of at least the predetermined magnitude flowing in the second power bus 6. In the case of an internal fault (shown as arc flash 24 in FIG. 3), the resulting light 25 and fault current 19 occur essentially simultaneously.

Conversely, for an external fault 34 (FIG. 1), fault current 35 flows for a relatively long period of time (as can be seen between the leading edges of the signals 20 and 26 of FIG. 2) prior to an arc flash 36 from arc chutes (not shown) being generated from interruption of the fault current 35 by the second circuit interrupter 12.

The disclosed concept need not operate a circuit interrupter, such as the first circuit interrupter 10, and can advantageously prevent the nuisance operation thereof, since the second circuit interrupter 12 is permitted to interrupt the external fault 34 (FIG. 1), as shown in FIG. 2, without operation of the shorting device 14 that would otherwise cause the first circuit interrupter 10 to open. As shown in FIGS. 1 and 2, the second circuit interrupter 12 trips opens and produces the arc flash 36 under normal operating conditions without operating the shorting device 14.

Figure 3:
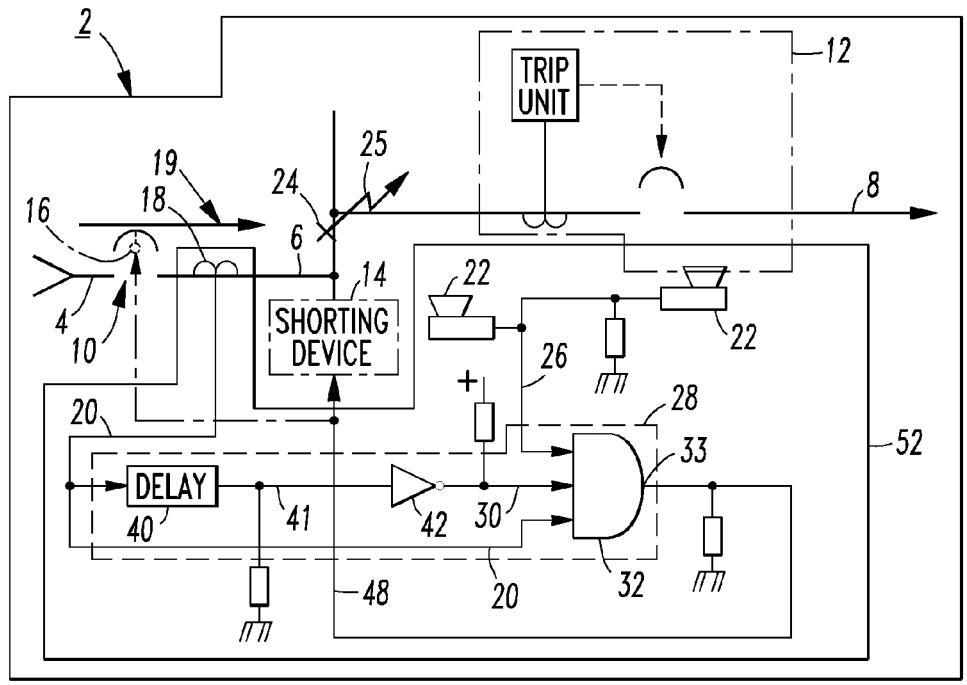
FIG. 3 is a block diagram in schematic form of the arc flash detection apparatus of FIG. 1, except with a fault on the main power bus.
Figure 4:
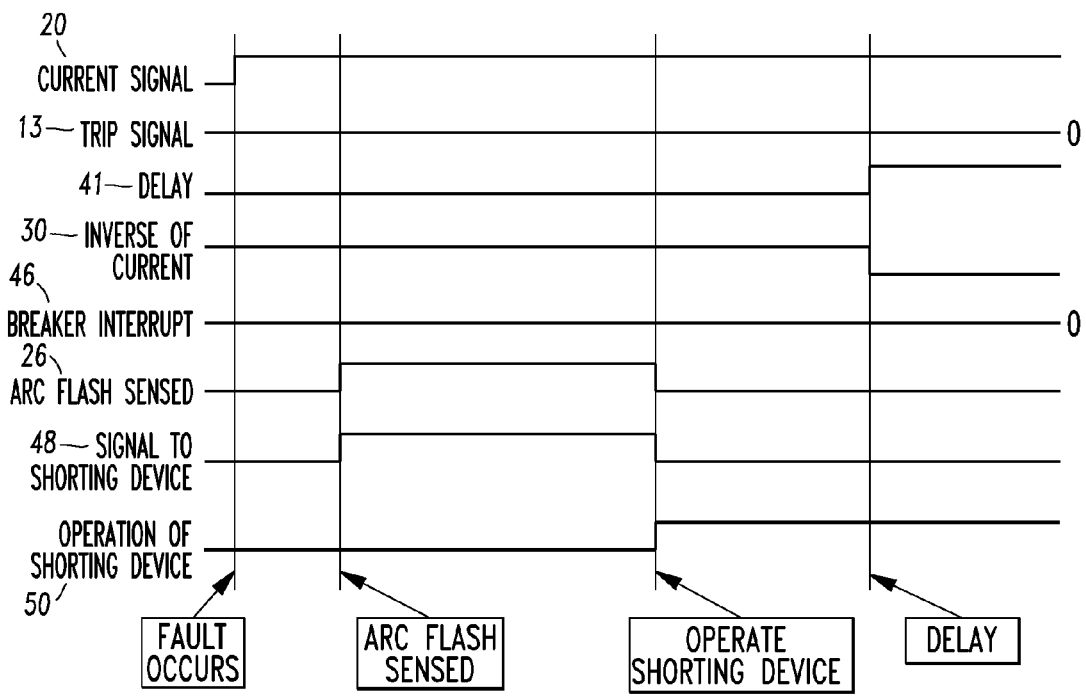
FIG. 4 includes plots of various signals versus time for the arc flash detection apparatus of FIG. 3.

Conversely, as shown in FIGS. 3 and 4, an internal fault (shown as arc flash 24) causes operation of the shorting device 14 that, in turn, causes the first circuit interrupter 10 to open.

Alternatively, the disclosed concept need not employ or operate the shorting device 14. Here, when output 33 of the three-input AND gate 32 is true, this causes a contact (not shown) to close, actuate the shunt trip coil 16 and, thus, trip open the first circuit interrupter 10. As has been discussed, each of the shorting device 14, which is actuated by the three-input AND gate output 33, and the shunt trip coil 16 can be separately employed or can be employed together in combination.

The example circuit 28 can include the series combination of a delay circuit 40 and an inverter 42 to delay and invert, respectively, the first logical signal 20 to provide the third logical signal 30. It will be appreciated, however, that the example circuit 28 can be any suitable analog and/or digital circuit, such as a hardware circuit and/or a processor-based (e.g., hardware and software/firmware) circuit. For example and without limitation, this could be a combination of digital and analog technology with embedded firmware.

For example, the shorting device 14 can have a first time to operate, for example, to short the second power bus 6 (e.g., phase-to-ground; phase-to-phase), the second circuit interrupter 12 can have a second time to interrupt fault current 35 (FIG. 3) flowing therethrough, the delay circuit 40 can provide a delay (e.g., without limitation, 3 mS; any suitable time, which is long/short enough to ensure that the current signal 20 (FIG. 2) is received before the arc flash 36 (FIG. 1) or 24 (FIG. 3) is sensed 26 (FIG. 2) with both first logical signal 20 being true and the third logical signal 30 being true as shown in FIG. 4; and the delay can be greater than the first time and less than the second time). For example, since it takes about several milliseconds for the second circuit interrupter 12 to sense the (external) fault current 35, and then open its separable contacts 15 (FIG. 1), this delay time can be increased to any suitable time less than the opening time of the second circuit interrupter 12. For example, the shorting device 14 can operate within about 2 mS of the initiation of the internal fault (shown as arc flash 24 in FIG. 3). After the signal 48 of FIG. 4 (from three-input AND gate output 33) is sent to the shorting device 14, this operates regardless of the duration of such signal 48 and, thus, it latches in its shorted position. In the plots of FIGS. 2, 4, 6 and 8, the three-input AND gate output 33 is enabled to be active for the delay window between signals 20 and 41 of FIG. 2. In FIG. 2, the delayed and inverted current sensor signal 30 originates upstream, as shown in FIGS. 1 and 3. Conversely in FIG. 6, the delayed and inverted current sensor signal 44 originates downstream or from near the right-most (with respect to FIGS. 5 and 7) light sensor 22.

Figure 6:
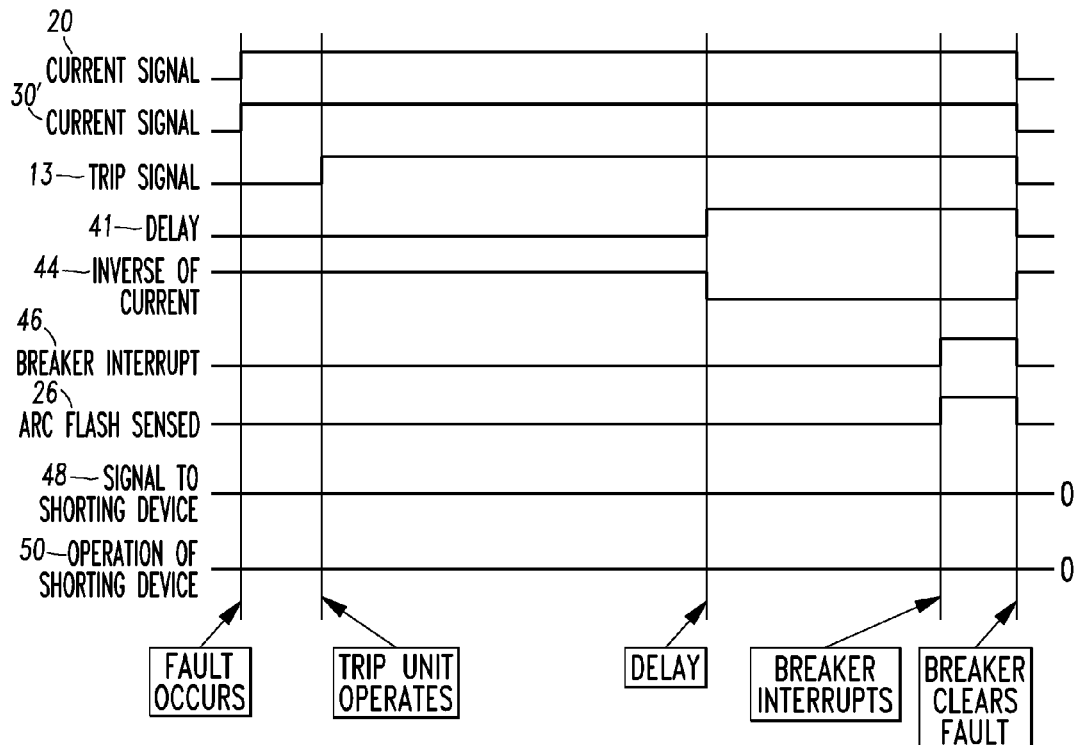
FIG. 6 includes plots of various signals versus time for the arc flash detection apparatus of FIG. 5.

In the plots of FIGS. 2 and 6, for the external fault 34, the example delayed signal 41 preferably has no delay after the trailing edge of the corresponding current signal 20 or 30', as shown. Alternatively, a delay after both the leading and trailing edges of the corresponding current signal 20 or 30' can be employed (e.g., without limitation, a delay line).

As can be seen from FIGS. 4 and 2, the circuit 28 can operate the shorting device 14 for the internal fault (shown as arc flash 24 in FIG. 3) on the second power bus 6, but it does not operate the shorting device 14 for the external fault 34 (FIG. 1) on the third power bus 8 or for the arc flash 36 from arc chutes (not shown) being generated from interruption of the fault current 35 by the second circuit interrupter 12 when protecting against such external fault 34. The circuit 28, the current sensor 18 and the number of light sensors 22 provide an arc flash detection apparatus 52 for the electrical system 2.

FIG. 2 shows the current signal 20 output by the current sensor 18, an internal trip signal 13 of the second circuit interrupter 12, the delayed signal 41 output by the delay circuit 40, and the inverted delayed signal 30 output by the inverter 42. The breaker interrupt signal 46 shows the timing of the interruption of the fault current 35 by the second circuit interrupter 12. The signal 26 shows the timing of the sensing of the arc flash 36 from the second circuit interrupter arc chutes (not shown). The arc flash 36 is generated from interruption of the fault current 35 by the second circuit interrupter 12. Signals 48 and 50 show that there is no signal to the shorting device 14 and that there is no operation of the same, since the output of three-input AND gate 32 is always false (since signal 30 is false when signal 26 is true).

FIG. 4 shows that there is no internal trip signal 13, no circuit breaker interrupt signal 46 and no interruption of the fault current 19 by the second circuit interrupter 12, since there is only the internal fault (shown as arc flash 24 in FIG. 3). Here, unlike FIG. 2, the signal 26 follows the current signal 20 since there is the internal fault (shown as arc flash 24 in FIG. 3). Signal 48 shows that there is the signal to the shorting device 14, since the output 33 of three-input AND gate 32 is true when the signal 26 is true. Signal 50 shows the operation of the shorting device 14 responsive to the signal 48.

The arc fault detection apparatus 52 of FIGS. 1 and 3 is preferred with respect to cost. Alternatively, FIGS. 5 and 7 show a second current sensor 18'.

Figure 5:
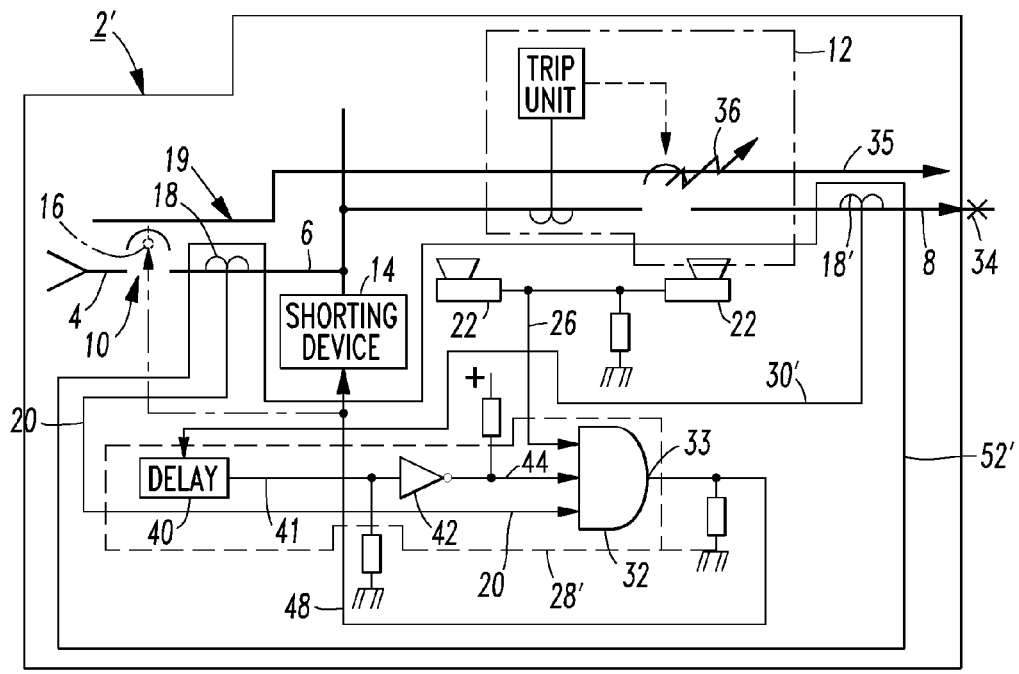
FIG. 5 is a block diagram in schematic form of an arc flash detection apparatus for use with switchgear comprising source service, main and feeder load side power buses, main and feeder circuit breakers, and a shorting device on the main power bus, with a fault on the feeder load side power bus in accordance with another embodiment of the disclosed concept.
Figure 7:
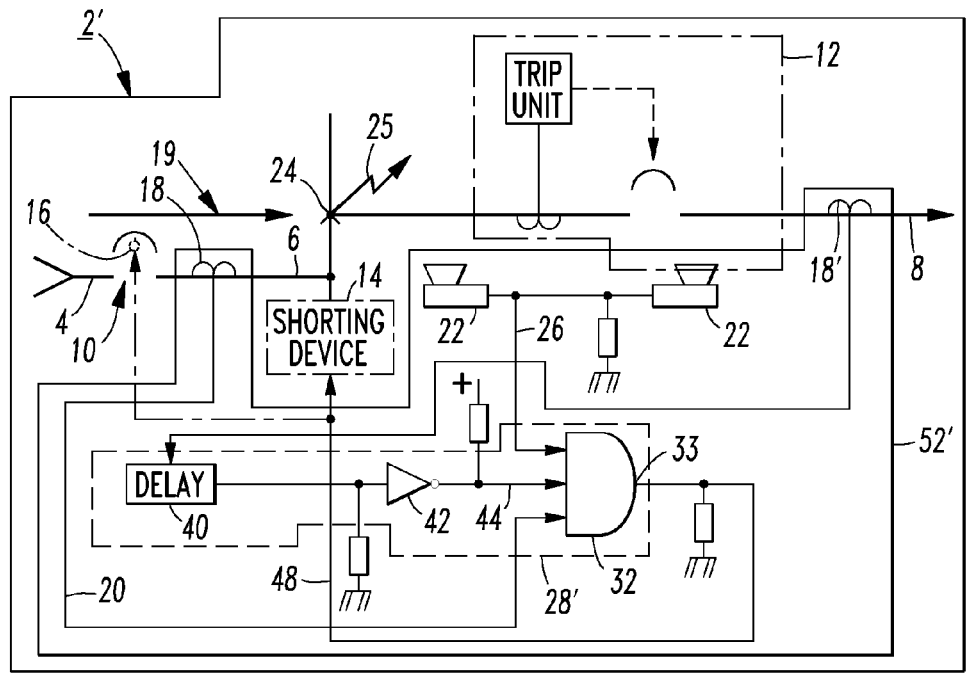
FIG. 7 is a block diagram in schematic form of the arc flash detection apparatus of FIG. 5, except with a fault on the main power bus.

Referring to FIGS. 5 and 7, an electrical system 2' is similar to the electrical system 2 of FIG. 1, except that there is added the second current sensor 18' structured to sense the fault current 35 of at least a predetermined magnitude flowing in the third power bus 8 and responsively output a third logical signal 30', and there is a somewhat different circuit 28'. The circuit 28' is structured to delay and invert the third logical signal 30' to provide a fourth logical signal, and to operate at least one of the shorting device 14 and the shunt trip coil 16 responsive to a logical AND of the first logical signal 20, the second logical signal 26 and the fourth logical signal 44.

Figure 8:
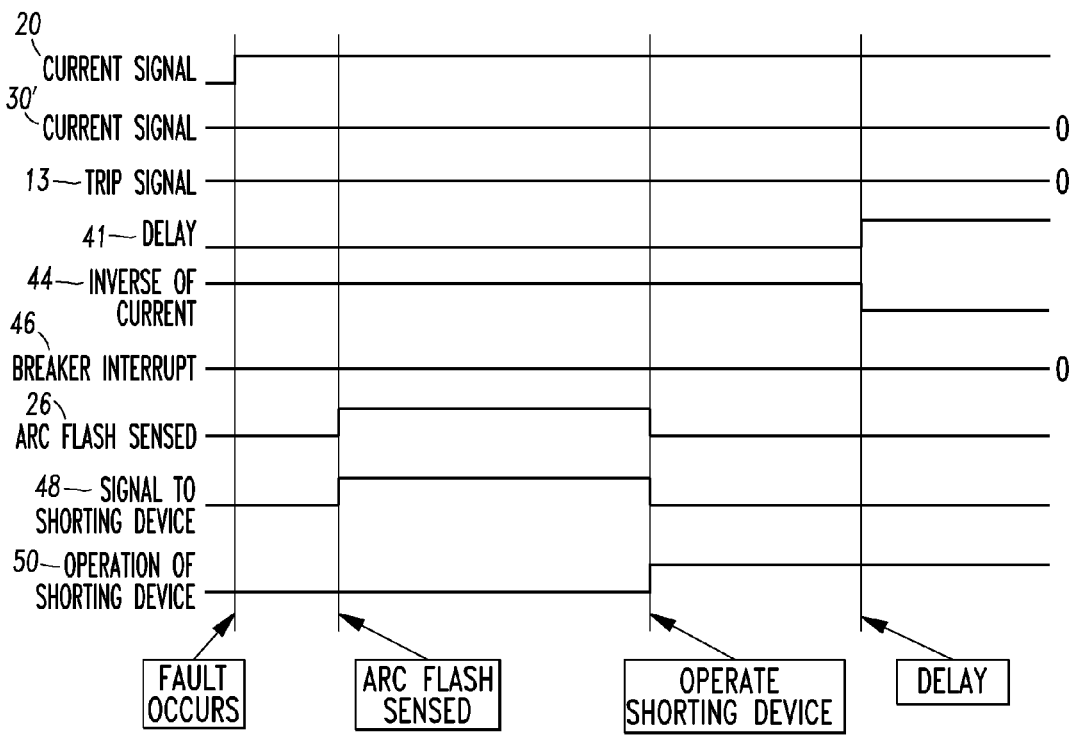
FIG. 8 includes plots of various signals versus time for the arc flash detection apparatus of FIG. 7.

As can be seen from FIGS. 8 and 6, the circuit 28' can operate the shorting device 14 for the internal fault (shown as arc flash 24 in FIG. 7) on the second power bus 6, but it does not operate the shorting device 14 for the external fault 34 on the third power bus 8 or for the arc flash 36 from arc chutes (not shown) being generated from interruption of the fault current 35 by the second circuit interrupter 12 when protecting against such external fault 34. The circuit 28', the current sensors 18,18' and the number of light sensors 22 provide an arc flash detection apparatus 52' for the electrical system 2'.

A "current location differentiation" method of FIGS. 5-8 is based upon the specific positioning of the current sensors 18,18'. With the current sensor 18' placed about the outgoing terminals (e.g., without limitation, load terminals) of the second circuit interrupter 12, the only time current is sensed by the second current sensor 18' is for the external fault 34, thus assuring that the electrical system 2' is blocked from operation as shown in FIG. 6. Conversely, as shown in FIG. 8, the internal fault (shown as arc flash 24 in FIG. 7) causes operation of the shorting device 14.

FIG. 6 is somewhat similar to FIG. 2, except that there is also a second current signal 30' output by the second current sensor 18'. Essentially, in this example, the second current signal 30' follows the first current signal 20. Otherwise, the general sequence of the other signals follows that of FIG. 2.

FIG. 8 is somewhat similar to FIG. 4, except that there is also the second current signal 30' output by the second current sensor 18'. Essentially, in this example, the second current signal 30' follows the first current signal 20. Otherwise, the general sequence of the other signals follows that of FIG. 4.

The disclosed concept can be employed in any electrical system that has an upstream circuit interrupter that can open when a local or internal arc flash event occurs. Some non-limiting applications of electrical systems include low voltage or medium voltage switchgear, motor control and switchboards.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical system comprising:
   a first power bus;
   a second power bus;
   a third power bus;
   a first circuit interrupter electrically connected between the first power bus and the second power bus;
   a second circuit interrupter electrically connected between the second power bus and the third power bus;
   at least one of: (a) a shorting apparatus operatively associated with the second power bus, and (b) the first circuit interrupter comprising a trip coil;
   a current sensor structured to sense a fault current of at least a predetermined magnitude flowing in the second power bus and responsively output a first logical signal;
   a number of light sensors structured to sense an arc flash operatively associated with a number of the second power bus and the third power bus and responsively output a second logical signal; and
   a circuit structured to delay and invert the first logical signal to provide a third logical signal, and to operate the at least one of the shorting apparatus and the trip coil responsive to a logical AND of the first logical signal, the second logical signal and the third logical signal.

2. The electrical system of claim 1 wherein the current sensor is structured to sense the fault current and output the first logical signal when the sensed fault current exceeds a predetermined magnitude.

3. The electrical system of claim 1 wherein the circuit comprises the series combination of a delay circuit and an inverter to delay and invert, respectively, the first logical signal to provide the third logical signal.

4. The electrical system of claim 3 wherein the shorting apparatus has a first time to operate; wherein the second circuit interrupter has a second time to interrupt current; wherein the delay circuit provides a delay between the first logical signal being true and the third logical signal being true; and wherein the delay is greater than the first time and less than the second time.

5. The electrical system of claim 1 wherein the circuit comprises a three-input AND gate structured to provide the logical AND of the first logical signal, the second logical signal and the third logical signal, and an output to operate the at least one of the shorting apparatus and the trip coil.

6. The electrical system of claim 1 wherein the circuit operates the shorting apparatus for a fault on the second power bus, but does not operate the shorting apparatus for a fault on the third power bus or for an arc generated by the second current interrupter when protecting against the fault on the third power bus.

7. An electrical system comprising:
   a first power bus;
   a second power bus;
   a third power bus;
   a first circuit interrupter electrically connected between the first power bus and the second power bus;
   a second circuit interrupter electrically connected between the second power bus and the third power bus;
   at least one of: (a) a shorting apparatus operatively associated with the second power bus, and (b) the first circuit interrupter comprising a trip coil;
   a first current sensor structured to sense a fault current of at least a predetermined magnitude flowing in the second power bus and responsively output a first logical signal;
   a number of light sensors structured to sense an arc flash operatively associated with a number of the second power bus and the third power bus and responsively output a second logical signal;
   a second current sensor structured to sense a fault current of at least a predetermined magnitude flowing in the third power bus and responsively output a third logical signal; and
   a circuit structured to delay and invert the third logical signal to provide a fourth logical signal, and to operate the at least one of the shorting apparatus and the trip coil responsive to a logical AND of the first logical signal, the second logical signal and the fourth logical signal.

8. The electrical system of claim 7 wherein the first current sensor and the second current sensor are both structured to sense a corresponding fault current and output a corresponding logical signal when the sensed corresponding fault current exceeds a corresponding predetermined magnitude.

9. The electrical system of claim 7 wherein the circuit comprises the series combination of a delay circuit and an inverter to delay and invert, respectively, the third logical signal to provide the fourth logical signal.

10. The electrical system of claim 9 wherein the shorting apparatus has a first time to operate; wherein the second circuit interrupter has a second time to interrupt current; wherein the delay circuit provides a delay between the third logical signal being true and the fourth logical signal being true; and wherein the delay is greater than the first time and less than the second time.

11. The electrical system of claim 7 wherein the circuit comprises a three-input AND gate structured to provide the logical AND of the first logical signal, the second logical signal and the fourth logical signal, and an output to operate the at least one of the shorting apparatus and the trip coil.

12. The electrical system of claim 7 wherein the circuit operates the shorting apparatus for a fault on the second power bus, but does not operate the shorting apparatus for a fault on the third power bus or for an arc generated by the second current interrupter when protecting against the fault on the third power bus.

13. An arc flash detection apparatus for an electrical system comprising a first power bus, a second power bus, a third power bus, a first circuit interrupter electrically connected between the first power bus and the second power bus, a second circuit interrupter electrically connected between the second power bus and the third power bus, and at least one of: (a) a shorting apparatus operatively associated with the second power bus, and (b) the first circuit interrupter comprising a trip coil, the arc flash detection apparatus comprising:
   a current sensor structured to sense a fault current of at least a predetermined magnitude flowing in the second power bus and responsively output a first logical signal;
   a number of light sensors structured to sense an arc flash operatively associated with a number of the second power bus and the third power bus and responsively output a second logical signal; and
   a circuit structured to delay and invert the first logical signal to provide a third logical signal, and to operate the at least one of the shorting apparatus and the trip coil responsive to a logical AND of the first logical signal, the second logical signal and the third logical signal.

14. The arc flash detection apparatus of claim 13 wherein the current sensor is structured to output the first logical signal when the sensed fault current exceeds a predetermined magnitude.

15. The arc flash detection apparatus of claim 13 wherein the circuit comprises the series combination of a delay circuit and an inverter to delay and invert, respectively, the first logical signal to provide the third logical signal; wherein the shorting apparatus has a first time to operate; wherein the second circuit interrupter has a second time to interrupt current; wherein the delay circuit provides a delay between the first logical signal being true and the third logical signal being true; and wherein the delay is greater than the first time and less than the second time.

16. The arc flash detection apparatus of claim 13 wherein the circuit comprises a three-input AND gate structured to provide the logical AND of the first logical signal, the second logical signal and the third logical signal, and an output to operate the at least one of the shorting apparatus and the trip coil.

17. An arc flash detection apparatus for an electrical system comprising a first power bus, a second power bus, a third power bus, a first circuit interrupter electrically connected between the first power bus and the second power bus, a second circuit interrupter electrically connected between the second power bus and the third power bus, and at least one of: (a) a shorting apparatus operatively associated with the second power bus, and (b) the first circuit interrupter comprising a trip coil, the arc flash detection apparatus comprising:
   a first current sensor structured to sense a fault current of at least a predetermined magnitude flowing in the second power bus and responsively output a first logical signal;
   a number of light sensors structured to sense an arc flash operatively associated with a number of the second power bus and the third power bus and responsively output a second logical signal;
   a second current sensor structured to sense a fault current of at least a predetermined magnitude flowing in the third power bus and responsively output a third logical signal; and
   a circuit structured to delay and invert the third logical signal to provide a fourth logical signal, and to operate the at least one of the shorting apparatus and the trip coil responsive to a logical AND of the first logical signal, the second logical signal and the fourth logical signal.

18. The arc flash detection apparatus of claim 17 wherein the first current sensor and the second current sensor are both structured to sense a corresponding fault current and output a corresponding logical signal when the sensed corresponding fault current exceeds a corresponding predetermined magnitude.

19. The arc flash detection apparatus of claim 17 wherein the shorting apparatus has a first time to operate; wherein the second circuit interrupter has a second time to interrupt current; wherein the delay circuit provides a delay between the third logical signal being true and the fourth logical signal being true; and wherein the delay is greater than the first time and less than the second time.

20. The arc flash detection apparatus of claim 17 wherein the circuit comprises a three-input AND gate structured to provide the logical AND of the first logical signal, the second logical signal and the fourth logical signal, and an output to operate the at least one of the shorting apparatus and the trip coil.

* * * * *